United States Patent [19]

Koga et al.

[11] Patent Number: 4,810,753

[45] Date of Patent: Mar. 7, 1989

[54] PROCESS FOR PRODUCING POLYAMIDE

[75] Inventors: Shinichiro Koga, Nohgata; Masaaki Miyamoto, Kitakyushu; Hidemi Nakanishi, Kitakyushu, all of Japan

[73] Assignee: Mitsubishi Chemical Industries Limited, Tokyo, Japan

[21] Appl. No.: 921,387

[22] Filed: Oct. 22, 1986

[30] Foreign Application Priority Data

Oct. 29, 1985 [JP] Japan .................. 60-241788
Aug. 8, 1986 [JP] Japan .................. 61-186464

[51] Int. Cl.$^4$ .............................................. C08L 77/00
[52] U.S. Cl. ...................................... 525/183; 525/184
[58] Field of Search ................................ 525/183, 184

[56] References Cited

U.S. PATENT DOCUMENTS 4,473,686 9/1984 Grigo et al. ................ 525/184
4,567,226 1/1986 Grigo et al. ................ 525/184

FOREIGN PATENT DOCUMENTS 2038317 2/1972 Fed. Rep. of Germany .

OTHER PUBLICATIONS

Patent Abstracts of Japan, vol. 5, No. 28, (C-44) [700], Feb. 20, 1981.
Patent Abstracts of Japan, vol. 9, No. 78 (C-274) [1801], Apr. 6, 1985.
Patent Abstracts of Japan, vol. 9, No. 71 (C-272) [1974], Mar. 30, 1985.
Patent Abstracts of Japan, vol. 3, No. 63 (C-47), May 30, 1979, p. 163 C 47.
Patent Abstracts of Japan, vol. 3, No. 55 (C-45), May 11, 1979, p. 152 C 45.

*Primary Examiner*—John C. Bleutge
*Assistant Examiner*—A. Carrillo
*Attorney, Agent, or Firm*—Oblon, Fisher, Spivak, McClelland & Maier

[57] ABSTRACT

Disclosed herein is a process for producing a polyamide comprising polymerizing at least one monomer of polyamide in the presence of
(1) a hydrocarbon polymer having at least one group selected from the group consisting of a carboxyl group, a derivative group of carboxylic acid, an amino group, and a hydroxyl group, or
(2) a polymer produced by reacting the hydrocarbon polymer with a polyamide, or polymerizing at least one monomer of polyamide in the presence of the hydrocarbon polymer.

8 Claims, No Drawings

PROCESS FOR PRODUCING POLYAMIDE

BACKGROUND OF THE INVENTION

The present invention relates to a process for producing a polyamide and, more particularly, to a process for producing a polyamide in which a polyamide is polymerized in a reduced polymerization time while defoaming the bubbles produced during the production of the polyamide.

In most conventional polyamide production processes, the stage in which bubbles generate determines the rate of production irrespective of a polymerization system (a batch-wise system or a continuous system), and improvement in this respect has been demanded.

As a result of studies on defoaming in the stage of the generation of bubbles in producing a polyamide, the present inventors have found that an excellent defoaming effect is displayed when at least one monomer of polyamide (hereinafter referred to as "polyamide material") is polymerized in the presence of a predetermined amount of a hydrocarbon polymer or a polymer of a hydrocarbon polymer with a polyamide, and on the basis of this finding, the present invention of a process for producing a polyamide which has a high industrial value has been achieved.

SUMMARY OF THE INVENTION

In an aspect of the present invention, there is provided a process for producing a polyamide comprising polymerizing a polyamide material in the presence of (1) a hydrocarbon polymer having at least one group selected from the group consisting of a carboxyl group, a carboxyl acid derivative group, an amino group and a hydroxyl group (hereinafter referred to as "modified hydrocarbon polymer"), or (2) a polymer obtained by reacting the modified hydrocarbon polymer with a polyamide or by polymerizing a polyamide material in the presence of the modified hydrocarbon polymer (hereinafter referred to as "polyamide copolymer").

DESCRIPTION OF THE PREFERRED EMBODIMENTS

The polyamide material, namely, a monomer of a polyamide used in the present invention includes lactam of a ring having not less than 3 carbons, polymerizable ω-amino acid, dibasic acid, diamine, etc. More concretely, as monomers lactams such as ε-caprolactam, enantholactam, caprolactam, lauryllactam, α-pyrrolidone and α-piperidone; α-amino acids such as 6-aminocaproic acid, 7-aminoheptanoic acid, 9-aminononanoic acid and 11-aminoundecanoic acid; dibasic acids such as adipic acid, glutaric acid, pimelic acid, suberic acid, azelaic acid , sebacic acid, undecanedionic acid dodecadionic acid, hexadecadionic acid, hexadecenedionic acid, eicosanedionic acid, eicosandienedionic acid, diglycollic acid, 2,2,4-trimethyladipic acid, xylylene dicarboxylic acid, 1,4-cyclohexane dicarboxylic acid, terephthalic acid and isophthalic acid; and diamines such as hexamethylenediamine, tetramethylenediamine, nonamethylenediamine, undecamethylenediamine, dodecamethylenediamine, 2,2,4 (or 2,4,4)-trimethylhexamethylenediamine, bis-(4,4'-aminocyclohexyl) methane and methaxylylenediamine may be exemplified.

The polymerization reaction in producing a polyamide according to the present invention is initiated using the polyamide material in the normal way and the modified hydrocarbon polymer or the polyamide copolymer can be added in an optional stage between the start of the polymerization reaction and the start of pressure release or pressure reduction.

In the case of polymerization of lactams in the presence of alkali catalyst, an alkaline metal such as lithium, sodium, potassium; an alkaline earth metal such as magnesium, calcium, strontium and barium; or a hydride thereof is used as the catalyst. The reaction may be carried out either in the presence or in the absence of an organic diluent. In this case, the modified hydrocarbon polymer or the polyamide copolymer may be added in an optional stage before the start of the polymerization reaction.

As the hydrocarbon polymer, a homopolymer or copolymer of α-olefin such as ethylene and propylene, and a hydrogenated homopolymer or copolymer of dienes may be exemplified, and in particular, a hydrogenated diene polymer is preferable.

As examples of the diene polymer, a homopolymer or a copolymer obtained by polymerizing at least one monomer selected from the group consisting of 1,3-butadiene, 1,3-pentadiene, chloroprene and isoprene may be exemplified, and a polymer of a conjugated diene and, in particular, polybutadiene and polyisoprene are preferably used.

Any method such as a radical, cation, anion or coordination polymerization method may be used when polymerizing dienes. At this time, styrene, α-methylstyrene, o- or p-vinyl toluene, vinyl xylene, acrylonitrile may coexist as a comonomer.

In order to introduce a hydroxyl group into the hydrocarbon polymer, for example, ethylene oxide may be reacted with a living polymer of a diene compound, or radical polymerization may be carried out using a radical initiator containing an OH-group such as hydrogen peroxide, 4,4'-azobis (4-cyano-n-amyl alcohol).

In order to introduce a carboxylic acid derivative group such as carboxylic acid group, ester group, acid halide or amino group into the hydrocarbon polymer, for example, carbon dioxide may be reacted with a living polymer of a diene compound, or the radical polymerization of a diene compound may be carried out using a radical initiator containing a carboxylic group or a carboxyl acid 0 derivative group such as 4,4'-azobis (4-cyano-valerianic acid). Alternatively, an acid halide or an anhydride may be reacted with the hydrocarbon polymer having a hydroxyl group.

In addition, a method of reacting ethylene oxide and the like with a living polymer of a diene compound, and a method of obtaining a polymer containing a carboxyl group by reacting acid halide or anhydride with a diene polymer containing a hydroxyl group obtained by the radical polymerization in which a radical initiator containing an OH-group such as hydrogen peroxide and 4,4'-azobis (4-cyano-n-amyl alcohol) may be exemplified.

Furthermore, a method of reacting a monomer having a carboxyl group or a carboxylic acid derivative group with a monomer containing a diene may be used.

As examples of the monomers having a carboxyl group or a carboxylic acid derivative group, acrylic acid, methacrylic acid, maleic acid, fumaric acid, chloromaleic acid, itaconic acid, and derivatives thereof such as ester of the above-mentioned acid with methanol, phenol and the like, and anhydride such as anhydrous maleic acid may be exemplified.

These monomers may be added to a hydrogenated polymer containing a diene in the form of a derivative of carboxylic acid, and may also be converted a carboxyl group into the corresponding derivative after carboxylic acid or an anhydride thereof is added to these monomers.

As a method of introducing an amino group, there is a method of cyanoethylating the hydroxyl group of a polymer containing a diene into which the hydroxyl group is introduced and hydrogenating cyanoethyl group, and aminating the halogen atom after halogenating hydroxyl group may be exemplified.

A polymer containing a diene and having a carboxyl group, and a hydrogenated polymer thereof, or a polymer containing a diene for introducing a polar group selected from a carboxyl group, a carboxylic acid derivative group and an amino group are commercially available. For example the following are usable.

Nisso-PB G-1000 (trade name: produced by Nippon Soda Co., Ltd.)
Nisso-PB G-2000 (ditto)
Nisso-PB G-3000 (ditto)
Nisso-PB GI-1000 (ditto)
Nisso-PB GI-2000 (ditto)
Nisso-PB GI-3000 (ditto)
Nisso-PB C-1000 (ditto)
Nisso-PB CI-1000 (ditto)
Polyter H (trade name: produced by Mitsubishi Chemical Industries, Ltd.)
Polyter HA (ditto)
Poly-BD (trade name: produced by Arco, Ltd.)
Batarez HT (trade name: produced by Philips Ltd.)
Hycar BTB (trade name: Goodrich, Ltd.)
Telosen HT (trade name: General Tyre Ltd.)

The number-average molecular weight of these modified hydrocarbon polymers is 500 to 20,000 preferably 1,000 to 10,000. If the number-average molecular weight is too small, the defoaming effect is disadvantageously lessened, while too large number-average molecular weight deteriorates dispersibility of the hydrocarbon polymers in a polyamide, which also reduces the defoaming effect.

It is possible to produce a polyamide copolymer which is obtained by reacting a polyamide with a modified hydrocarbon polymer in various methods disclosed in Japanese Patent Application Laying-Open (KOKAI) Nos. 57-149329/1982, 57-151622/1982, 59-213723/1984, 59-202220/1984, etc. For example, there are a method of mixing a polyamide material with a modified hydrocarbon polymer in advance and obtaining a polyamide polymer by an ordinary polycondensation or ring opening polymerization, and a method of polymerizing a polyamide material thereby obtaining a polyamide of a number-average molecular weight of 1,000 to 50,000, preferably 5,000 to 40,000, and melt-mixing and reacting the thus obtained polyamide with a modified hydrocarbon copolymer. In this case, if the molecular weight of the polyamide is too small, no defoaming effect is expected, while too large molecular weight increases the viscosity, and makes it difficult to operate the reaction with a modified hydrocarbon polymer and to handle the produced polyamide copolymer.

At this time, it is possible to use dicarboxylic acid, a dicarboxylic acid derivative or diamine as a chain restricting agent to control the average molecular weight of the polyamide.

The weight ratio of the hydrocarbon polymer component to the polyamide component in the polyamide copolymer is 1:99 to 99:1, preferably 3:97 to 97:3. If the ratio of the hydrocarbon polymer component is too small, it is difficult to expect the defoaming effect. On the other hand, if the ratio is too large, the hydrocarbon polymer is not well dispersed into the polyamide during polymerization, which does not produce a good defoaming effect.

The molecular weight of the polyamide copolymer is determined by the kind, volume ratio, reaction condition, etc. of the modified hydrocarbon polymer material and the polyamide material or the polymer thereof, and is ordinarily 2,000 to 60,000, preferably 5,000 to 50,000.

The weight ratio of (1) the modified hydrocarbon polymer to a polyamide material or (2) the modified hydrocarbon polymer of the polyamide copolymer to a polyamide material, which is required in polymerizing a polyamide material, is in the range of not less than 1 ppm to less than 10,000 ppm, preferably 2 to 5,000 ppm, more preferably 5 to 1,000 ppm.

If the weight ratio is too small, no defoaming effect is obtained, while too much weight ratio disadvantageously accelerates foaming action more than when nothing is added.

When a polyamide material is polymerized, a reinforcing agent such as a glass fiber and a carbon fiber; a filler such as silica, alumina, silica alumina, silica magnesia, calcium carbonate, gypsum, and clay; a lubricant of a higher fatty acid or its derivative such as stearic acid, octadecyl stearate, barium stearate, calcium stearate and magnesium stearate; a flame retardant such as a melamine derivative, cyanuric acids and a triazinyl base ring; and other additives may be used together with the polyamide copolymer.

According to the present invention, the use of a very small amount of modified hydrocarbon polymer or polyamide copolymer is able to reduce greatly the foaming during the production of a polyamide and, in addition, the defoaming effect is prominent especially when bubbles are likely to be produced, for example, at a time of polymerization with a higher fatty acid or a derivative thereof added. Thus, it can be said that the present invention is industrially very valuable.

The present invention will be explained in more detail with reference to the following examples, but it is to be understood that the present invention is not limited thereto and various modifications are possible within the scope of the invention.

EXAMPLE OF PREPARATION OF A HYDROCARBON POLYMER HAVING A CARBOXYLIC ACID GROUP 10 l of refined cyclohexane (distilled by ArF after LiAlH$_4$ treatment) and 1 kg of butadiene were charged into a 20 l reaction vessel and stirred, and 0.46 mol of n-BuLi was added to the mixture in the form of a hexane solution (2 mol/l). After the reaction was continued at room temperature for 24 hours, carbon dioxide gas which had been dehydrated by molecular sieves MS-4A was introduced into the reaction solution.

After the polymer solution was washed by water to remove the initiator, the solvent was distilled off under a reduced pressure to obtain 900 g of polymer.

The number-average molar weight was 2200 by VPO. The polymer obtained was dissolved into a solvent of isopropanol/n-heptane (1/1) and was hydrogenated at 120° C., under 30 atm for 6 hours in the presence of Ru/C as a catalyst. The carboxylic acid group of the polymer obtained was 0.45 meq/g and the iodine value was 3.5.

EXAMPLE OF PREPARATION OF A POLYAMIDE COPOLYMER

Carboxylic-acid-modified polybutadiene (1.2 unit content: 92%) was synthesized by introducing carbon dioxide gas into the anion-polymerized butadiene in the presence of sodium as a catalyst. The thus obtained polymer was hydrogenated to obtain a modified hydrocarbon polymer of a hydrogenation rate of 90%. The number-average molecular weight of the modified hydrocarbon polymer was 2200. 14 kg of ε-caprolactam, 129 g of hexamethylenediamine, 300 g of water and 2.4 kg of the thus obtained modified hydrocarbon polymer (the weight ratio of hydrocarbon to polyamide was 1:6) were charged into a 200 l autoclave, which was closed in a nitrogen atmosphere and the temperature was raised to 260° C. After the reaction was carried out for 2 hours under a pressure with stirring, the pressure was gradually released and reduced to 700 Torr and the reaction was carried out for 5 minutes under the reduced pressure.

Nitrogen was introduced, and after the pressure was restored to normal pressure, stirring was stopped. The reaction product was taken out in the form of a strand and was cut into chips. After the unreacted monomer was extracted from the reaction product using boiling water, the product was dried. The number-average molecular weight of the thus obtained polyamide copolymer was 11,300.

EXAMPLES 1 TO 6 AND COMPARATIVE EXAMPLES 1 TO 3

60 kg of ε-caprolactam; 1.2 kg of water; and a hydrocarbon polymer having a carboxylic acid group which had been produced in the "Example of preparation of a hydrocarbon polymer having a carboxylic acid group" in an amount shown in Table 1, a hydrocarbon polymer of a number-average molecular weight of 2,000 having 0.9 meq/g of hydroxyl group and an iodine value of 3.5 (trade mark: Polyter HA, produced by Mitsubishi Chemical Industries, Ltd.), or stearic acid or barium stearate together with Polyter were charged into a 200 l autoclave. The temperature was raised to 260° C. and the reaction was carried out for 2 hours under a pressure. The pressure was then released while maintaining the volume ratio of the bubbles to the liquid within the autoclave constantly at 0.8, and the time required for the pressure to reach normal pressure was measured. The results are shown in Table 1.

After the release of the pressure, the polymerization reaction was carried out at 250° C. under 500 Torr for 2 hours. The pressure was restored to normal pressure and the reaction product was taken out in the form of a strand and cut into chips. The unreacted monomer was extracted to be removed and the product was dried.

The relative viscosities of the polyamides obtained are shown in Table 1.

For comparison, the same processes as in Examples were repeated without adding any polyamide copolymer. The results are also shown in Table 1.

The relative viscosities were measured on the basis of JIS K 6810 by diluting the samples into 98% sulfuric acid so as to have a concentration of 1% at 25° C.

TABLE 1

|  |  | Examples |  |  |  |  |  | Comparative Examples |  |  |
|---|---|---|---|---|---|---|---|---|---|---|
|  |  | 1 | 2 | 3 | 4 | 5 | 6 | 1 | 2 | 3 |
| Modified Hydrocarbon Polymer | Kind | Example of Preparation | Example of Preparation | Example of Preparation | Example of Preparation | Example of Preparation | Polyter HA | — | — | — |
|  | Quantity (ppm) | 5 | 10 | 10 | 10 | 500 | 10 | 0 | 0 | 0 |
| Additive | Kind | — | — | Barium Stearate | Stearic Acid | Stearic Acid | Stearic Acid | — | Barium Stearate | Stearic acid |
|  | Quantity (%) | 0 | 0 | 0.23 | 0.85 | 0.85 | 0.85 | — | 0.23 | 0.85 |
| Pressure Release Time (min) |  | 12 | 10 | 30 | 45 | 45 | 45 | 15 | 60 | 90 |
| η rel |  | 3.50 | 3.48 | 2.99 | 2.58 | 2.60 | 2.58 | 3.46 | 3.00 | 2.58 |

EXAMPLES 7 TO 10

60 kg of ε-caprolactam; 1.2 kg of water; and a hydrocarbon polymer having a carboxylic group which had been produced in the "Example of preparation of a hydrocarbon polymer having a carboxylic acid group" in an amount shown in Table 2, or stearic acid or barium stearate together with the hydrocarbon polymer were charged into a 200 l autoclave and the temperature was raised to 260° C. to carry out reaction under a pressure for 2 hours. The other processes were the same as in Examples 1 to 6, and the pressure release time and the relative viscosities were measured in the same way as in Examples 1 to 6. The results are shown in Table 2.

TABLE 2

|  | Examples |  |  |  |
|---|---|---|---|---|
|  | 7 | 8 | 9 | 10 |
| Content of Polyamide Copolymer (Quantity of Hydrocarbon Polymer (ppm)) | 10 | 5 | 10 | 10 |
| Additive |  |  |  |  |
| Kind | — | — | Barium Stearate | Stearic acid |
| Quantity (%) | — | — | 0.23 | 0.85 |
| Pressure Release Time (min) | 5 | 6 | 9 | 12 |
| η rel | 3.48 | 3.50 | 2.99 | 2.58 |

EXAMPLE 11 AND COMPARATIVE EXAMPLE 4

83 kg of 60% saline solution was charged into a 200 l autoclave. After $N_2$ exchange, the temperature was raised to 260° C. while maintaining the pressure at 17.5 kg/cm$^2$G, and this state was held for 1.5 hours. The pressure was gradually released down to 2.5 kg/cm$^2$G. At this stage 5.41 meq/g of laurylamine and the hydrocarbon polymer having a carboxylic acid group which had been prepared in the "Example of preparation of a hydrocarbon polymer having a carboxylic acid group" were added to the solution and the mixture was held at the same temperature for another 1.5 hours.

The pressure was then released while maintaining the volume ratio of the bubbles to the liquid within the autoclave constantly at 0.8, and the time required for the pressure to reach normal pressure was measured. The result is shown in Table 3.

After the release of the pressure, the polymerization reaction was carried out at 250° C. under 250 Torr for 1 hour. The pressure was restored to normal pressure and the reacted product was taken out in the form of a strand, cut into chips and dried.

For comparison, the same process as in Example 11 was repeated without adding any modified hydrocarbon polymer. The result is also shown in Table 3.

TABLE 3

| | | Example 11 | Comparative Example 4 |
|---|---|---|---|
| Modified Hydrocarbon Polymer Additive | Kind | Example of Preparation | — |
| | Quantity (ppm) | 10 | — |
| | Kind | Laurylamine | Laurylamine |
| | Quantity (%) | 0.56 | 0.56 |
| Pressure Release Time (min) | | 10 | 30 |
| η rel | | 2.73 | 2.75 |

The relative viscosities were measured on the basis of JIS K 6810 by diluting the samples into 98% sulfuric acid so as to have a concentration of 1% at 25° C.

What is claimed is:

1. A process for producing a polyamide, comprising: polymerizing at least one monomer (A) selected from the group consisting of lactams having a ring size containing not less than three carbon atoms, polymerizable ω-amino acids, and combinations of a dibasic acid and a diamine in the presence of a polyamide copolymer comprising a hydrocarbon component and a polyamide component obtained by polymerizing at least one monomer (B) which forms a polyamide selected from the group consisting of lactams having a ring size containing not less than three carbon atoms, polymerizable Ω-amino acids and combinations of a dibasic acid and a diamine in the presence of a hydrocarbon polymer having at least one substituent selected from the group consisting of carboxyl groups and carboxylic acid derivative groups, the amount of the hydrocarbon polymer in the polyamide copolymer being in the range of not less than 1 ppm to less than 10000 ppm relative to said monomer (A) mixture.

2. The process for producing a polyamide according to claim 1, wherein said hydrocarbon polymer is selected from the group consisting of homopolymers of α-olefins, copolymers of α-olefins, hydrogenated homopolymers of dienes and hydrogenated copolymers of dienes.

3. The process for producing a polyamide according to claim 2, wherein said hydrocarbon polymer is a hydrogenated diene polymer.

4. The process for producing a polyamide according to claim 3, wherein said hydrogenated diene polymer is a homopolymer or copolymer obtained by polymerizing at least one monomer selected from the group consisting of 1,3-butadiene, 1,3-pentadiene, chloroprene and isoprene.

5. The process for producing a polyamide according to claim 4, wherein said hydrogenated diene polymer is polybutadiene or polyisoprene.

6. The process for producing a polyamide according to claim 1, wherein the number-average molecular weight of said hydrocarbon polymer is 500 to 20,000.

7. The process for producing a polyamide according to claim 1, wherein the weight ratio of the hydrocarbon polymer component to the polyamide component of said polyamide copolymer is 1:99 to 99:1.

8. The process for producing a polyamide according to claim 1, wherein the number-average molecular weight of the polyamide component in said polyamide copolymer is 1,000 to 50,000.

* * * * *